United States Patent [19]

Gregory

[11] Patent Number: 4,862,963

[45] Date of Patent: Sep. 5, 1989

[54] COSURFACTANT ENHANCED ALKALINE FLOODING IN AN ANHYDRITE FORMATION

[75] Inventor: M. Duane Gregory, Ponca City, Okla.

[73] Assignee: Conoco Inc., Ponca City, Okla.

[21] Appl. No.: 181,003

[22] Filed: Apr. 13, 1988

[51] Int. Cl.$^4$ .............................................. E21B 43/22
[52] U.S. Cl. .................................... 166/270; 166/275; 252/8.554
[58] Field of Search ........................ 166/270, 273, 275; 252/8.554

[56] References Cited

U.S. PATENT DOCUMENTS

| | | |
|---|---|---|
| H475 | 6/1988 | Lawson et al. .................... 166/270 |
| 3,091,291 | 5/1963 | Little et al. . |
| 3,175,610 | 3/1965 | Osoba . |
| 3,927,716 | 12/1975 | Burdyn et al. .................. 166/273 X |
| 4,008,767 | 2/1977 | Waite ................................. 166/273 |
| 4,274,488 | 6/1981 | Hedges et al. ..................... 166/273 |
| 4,466,892 | 8/1984 | Chan et al. .................... 166/270 X |
| 4,502,541 | 3/1985 | Lawson et al. ................ 166/270 X |
| 4,609,044 | 9/1986 | Lau ..................................... 166/270 |
| 4,727,938 | 3/1988 | Lau ..................................... 166/270 |
| 3,584,6866 | 6/1971 | Fulford . |

*Primary Examiner*—George A. Suchfield

[57] ABSTRACT

In cosurfactant enhanced alkaline flooding of a formation containing anhydrite, the pH of the flooding material is maintained at a high level by the addition of an alkali metal sulfate or ammonium sulfate.

3 Claims, No Drawings

COSURFACTANT ENHANCED ALKALINE FLOODING IN AN ANHYDRITE FORMATION

BACKGROUND AND SUMMARY OF THE INVENTION

1. Field of the Invention

Production of oil by any of the known reservoir-producing techniques, as for example water drive, gas cap drive, dissolved gas drive, gravity drainage, etc., leaves significant quantities of oil in the reservoir. The most efficient of these displacement mechanisms, whether it is a primary (naturally occurring) or secondary (rejuvenating) operation, is displacement of oil by water. However, even this technique leaves from one-tenth to one-third of the total reservoir pore space filled with oil.

When water attains a certain local saturation during a water drive or flooding operation, the continuous oil filaments break into disjointed segments which are entrapped and held immobile by capillary forces. Surface-active agents or surfactants have been employed to reduce the magnitude of the capillary forces in an attempt to prevent entrapment of the oil, or to free the oil after it has been trapped. In certain instances, where the oil is held at least partly by its adhesion to the rock surfaces, surface-active agents also may act as a detergent.

Surfactants may be added to the flood water or preferably, the surfactants may be produced in situ. Producing surface-active agents in situ has advantages over the simple introduction of surface-active agents to the floodwater, because when produced in situ the surface-active agents are concentrated in the interface between the oil and water where they are most needed, and because of this, they do not contact the rock surfaces with resultant adsorption by the rock surfaces. Also, variations in the interfacial tension which result from differences in concentration of the surface-active agents at different places in the interface cause localized stirring and turbulence which tend to cause the trapped oil to emulsify itself spontaneously. Further, the interfacial tension during the transient phase in which a surface-active agent is coming to equilibrium between the oil and water phases may be reduced below its equilibrium value by a factor of 100. This is believed to result from the fact that a much larger concentration of surface-active agent is maintained in the interface by in situ formation than can be obtained at equilibrium when the total concentration of surface-active agent is in the water phase.

One way in which the surface-active material can be formed in situ is by alkaline flooding. In alkaline flooding alkali present in the flooding material reacts with petroleum acids in the oil to produce surface-active agents at the oil-water interface. In cosurfactant-enhanced alkaline flooding a preformed surfactant is added to the flooding material. Thus the "primary surfactant" is formed by reaction in the formation and the added preformed surfactant is the "cosurfactant."

Some oil reservoirs contain large quantities of calcium sulfate (anhydrite) dispersed throughout the reservoir rock. Calcium sulfate is a slightly soluble salt which provides a constant source of calcium ions. These ions react with the alkali, e.g. NaOH in the cosurfactant-enhanced alkaline flooding material. The equation for this reaction is:

The effect is continuous consumption of the alkali with the result that it is impossible to maintain the preferred high concentration of hydroxide ion in the flooding material. Since high hydroxide concentration provides high pH, it is thus impossible to maintain a high pH in the flooding material.

In the method of this invention, the hydroxide concentration (high pH) in the flooding material is maintained by the addition to the flooding material of an alkali metal sulfate or ammonium sulfate.

2. Prior Art

U.S. Pat. No. 3,584,686 issued to Fulford relates to a method of minimizing deposition of calcium sulfate in a water flooding process by adjusting the total mineral salt content to a high enough concentration such that the solubility of calcium sulfate does not decrease with a decrease in the water flood pressure. Flooding media salt concentration may consist of brine alone or in combination with a controlled amount of other salts including sodium sulfate in order to adjust the salt content of the fluid drive.

U.S. Pat. No. 3,091,291 issued to Little et al. discloses a method of treating an underground formation with ammonium bicarbonate in order to prevent calcium sulfate formation. The exact amount of bicarbonate needed to be maintained in the injection fluid is measured by converting all the sulfates of calcium into ammonium sulfate when calcium carbonate is precipitated.

U.S. Pat. No. 3,175,610 issued to Osoba discloses removing undesired calcium ions from a flood water by first flooding the formation with a solution that is higher in sodium chloride concentration than the water in the formation. This solution displaces calcium from the surfaces of the rock. Injection of floodwater containing a lower sodium chloride concentration than the preceding solution then follows the injection of the higher sodium chloride concentration solution, and the floodwater is stripped of its calcium by the rock surfaces.

DETAILED DESCRIPTION OF THE INVENTION

A general description of alkaline flooding has been provided earlier. The basic principle involved is that of attaining and maintaining conditions of optimal salinity for the alkaline chemical slug. The optimal salinity is the salinity at which the chemical displaces the oil most efficiently. The optimum salinity for most alkaline floods is very low. This is the salinity at which minimum interfacial tension (IFT) in a crude oil alkali system occurs. Alkali consumption by the reservoir requires that the alkali concentration be higher than that which produces the minimum IFT. At concentrations of alkali above that required for minimum IFT, the system becomes over optimum. In other words, the salinity is too high for the surfactant to function properly. When this occurs in chemical flooding, a cosurfactant may be added to increase the salinity tolerance of the primary surfactant. The cosurfactant usually has a greater brine-to-oil relative solubility than the primary surfactant. Similarly, a cosurfactant can be added to an alkaline flood to increase the salinity tolerance of the petroleum soaps. Thus the solution is the use of cosurfactant-enhanced alkaline flooding in which a relatively high alkali concentration can be used if the correct cosurfactant is employed to increase to overall salinity tolerance of the primary surfactant.

In the method of this invention cosurfactant-enhanced alkaline flooding involves introducing to an oil-bearing formation containing anhydrite, which has been previously subjected to primary and secondary oil recovery, a suitable brine containing a cosurfactant, an alkaline component, and an alkali metal or ammonium sulfate.

A wide variety of cosurfactants may be used in the flooding operation. They include but are not limited to petroleum sulfonates, alkaryl sulfonates having the formula:

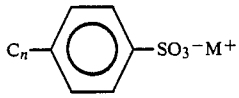

in which n varies from about 8 to 20 and M is an alkali metal; internal olefin sulfonates of the formula:

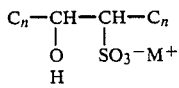

in which n varies from about 2 to 22 and M is an alkali metal; α-olefin sulfonates having the formula

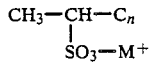

in which n varies from about 8 to 22 and M is an alkali metal; sulfated ethoxylated alcohols having the formula

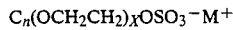

in which n varies from about 8 to 20, X varies from about 1 to 20 and M is an alkali metal; sulfated ethoxylated alkyl phenols having the formula

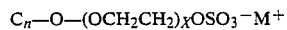

in which n varies from about 8 to 20, X varies from about 1 to 20 and M is an alkali metal; sulfonated ethoxylated alcohols having the formula

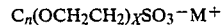

in which n varies from about 8 to 20, X varies from about 1 to 20 and M is an alkali metal; and sulfonated ethoxylated alkyl phenols having the formula

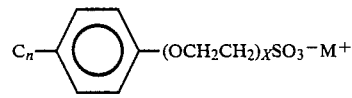

in which n varies from about 8 to 20, X varies from about 1 to 20 and M is an alkali metal.

The alkaline component employed in the cosurfactant-enhanced alkaline flooding is usually an alkali metal hydroxide such as sodium hydroxide or potassium hydroxide. Also useful are the alkali metal silicates. The sulfates which are used to maintain a high pH in flooding material are preferably the alkali metal sulfates such as sodium or potassium. However, ammonium sulfate may also be employed for this purpose.

The amount of cosurfactant used in the flooding material will vary depending on the composition of the brine and the quantity of alkaline component in the brine. Usually the cosurfactant will constitute between about 0.1 and about 0.5 weight percent based on the brine. The alkaline component may also vary, but usually is between about 0.25 and about 5.0 weight percent based on the brine, and preferably between 0.5 and about 2.0 percent.

The amount of sulfate employed is sufficient to substantially prevent precipitation of the alkaline component by calcium sulfate contained in the formation. The amount of sulfate required will also vary depending on the amount of alkaline component in the flooding material. Usually the amount of sulfate in terms of sodium sulfate will be between about 1.0 and about 5.0 weight percent based on the brine.

The principal component of the flooding material is water (brine) which is normally obtained in the same locality as the flooding operation. Fresh water may be used; however, usually the water available is brackish and may even be seawater. When excessive Mg and Ca cations are present, it may be desirable to treat the water source with water softeners to remove these cations prior to addition of the alkaline component.

The cosurfactant enhanced alkaline flooding material is customarily introduced into the formation in slugs of a size depending on the volume of the oil-bearing formation. The number of slugs employed ordinarily will be sufficient to effect economic recovery of oil remaining in the formation.

The following examples illustrate the results obtained in carrying out the invention.

Compositions of two brines which were used in the examples are set forth in Table 1. Both are typical brines which would be used in a water flood.

TABLE 1

| Major Components | COMPOSITION OF BRINES | |
| --- | --- | --- |
| | Milligrams/Liter | |
| | Brine No. 1 | Brine No. 2 |
| Ca$^{++}$ | 660 | 200 |
| Mg$^{++}$ | 130 | 66 |
| K$^+$ | 53 | — |
| Na$^+$ | 150 | 3 |
| SO$_4$$^=$ | 1870 | 585 |
| HCO$_3$$^-$ | 344 | 212 |
| Cl$^-$ | 47 | — |
| OH$^-$ | — | — |

In each of the following examples SO$_4$$^=$ was added as Na$_2$SO$_4$:

EXAMPLE 1

In the first example experiments were conducted with softened (to remove Ca and Mg) Brine No. 1. The sulfate concentration of 1870 mg/l was increased in approximately 100 mg/l increments to 2500 mg/l. A parallel set of samples was prepared using the same brine containing 0.5 percent NaOH. After equilibration with CaSO$_4$ at 90° F., an aliquot of each solution was removed with a syringe equipped with a 0.45 micron Millipore ® filter. The filter was to prevent any CaSO$_4$ particles from entering the syringe. The solutions were analyzed for calcium, sulfate and alkali (if applicable). The results of the analyses are contained in Table 2.

TABLE 2

$CaSO_4$ SOLUBILITY IN SOFTENED BRINE NO. 1 WITH ADDED SULFATE

| | Before Equilibration | | After Equilibration | | |
|---|---|---|---|---|---|
| Sample Number | Sulfate, mg/l | Alkali mg/l as NaOH | Sulfate mg/l | Calcium mg/l | Alkali, mg/l as NaOH |
| 1 | 1870 (Brine No. 1) | 0 | 3450 | 660 | 0 |
| 2 | 2000 | 0 | 3960 | 660 | 0 |
| 3 | 2100 | 0 | 4210 | 640 | 0 |
| 4 | 2200 | 0 | 3910 | 610 | 0 |
| 5 | 2300 | 0 | 4320 | 620 | 0 |
| 6 | 2400 | 0 | 4250 | 610 | 0 |
| 7 | 2500 | 0 | 4250 | 580 | 0 |
| 8 | 1870 (Brine No. 1) | 5018 | 5930 | 860 | 1660 |
| 9 | 2000 | 5018 | 6050 | 850 | 1664 |
| 10 | 2100 | 5018 | 6150 | 850 | 1667 |
| 11 | 2200 | 5018 | 6250 | 830 | 1650 |
| 12 | 2300 | 5018 | 6580 | 840 | 1687 |
| 13 | 2400 | 5018 | 6530 | 830 | 1706 |
| 14 | 2500 | 5018 | 6660 | 830 | 1728 |

The first sample shows that a soft brine already containing a slight excess of sulfate, with respect to anhydrite, will support the dissolution of anhydrite to the same point that would be expected in distilled water. It is as if the original 1870 mg/l of sulfate did not exist. Samples 2 through 7 show the same thing. There does appear to be a trend toward decreasing calcium concentration (decreasing anhydrite dissolution) as the added sulfate concentration increases; however, the decrease is insignificant compared to what the solubility product for anhydrite predicts.

Samples 8 through 14 were the same as the first seven samples except 0.5 percent NaOH was added. The result was that the anhydrite was solubilized in even greater amounts. About two thirds of the alkali was depleted in the dissolution process. The results indicated that increased concentration of sulfate ion would not depress the $CaSO_4$ dissolution.

EXAMPLE 2

In the second example solubility tests were made in softened Brine No. 2 with no extra sulfate. $CaSO_4$ solubility was determined in the soft brine, soft brine + 1.5 percent NaOH and soft brine + 0.66 percent $Na_2CO_3$. The results are shown in Table 3.

TABLE 3

$CaSO_4$ SOLUBILITY IN SOFTENED BRINE NO. 2

| | Before Equilibration | | After Equilibration | | |
|---|---|---|---|---|---|
| Sample Number | Sulfate, mg/l | Alkali mg/l as NaOH | Sulfate, mg/l | Calcium, mg/l | Alkali mg/l as NaOH |
| 1 | 528 | 0* | — | — | — |
| 2 | 528 | 4993** | — | — | — |
| 3 | 528 | 5008*** | — | — | — |
| 4 | 528 | 0 | 2418 | 750 | 0 |
| 5 | 528 | 0 | 2453 | 760 | 0 |
| 6 | 528 | 0 | 2599 | 760 | 0 |
| 7 | 528 | 4993 | 5082 | 870 | 2748 |
| 8 | 528 | 4993 | 5107 | 890 | 2765 |
| 9 | 528 | 4993 | 5100 | 870 | 2750 |
| 10 | 528 | 5008 | 6866 | 450 | 0 |
| 11 | 528 | 5008 | 6684 | 430 | 0 |
| 12 | 528 | 5008 | 6850 | 420 | 0 |

*Soft Brine No. 2.
**Soft Brine No. 2 + 0.5 NaOH.
***Soft Brine No. 2 + 0.66 $Na_2CO_3$.

The first three samples show the sulfate and alkali contents of the three brines before equilibration with anhydrite. The sodium carbonate concentration (0.66 percent) was equivalent (as $Na_2O$) to 0.5 percent NaOH.

$CaSO_4$ solubility in the soft Brine No. 2 is shown by samples 4, 5 and 6. The average calcium concentration was 757 mg/l. Samples 7, 8 and 9 show that the calcium concentration increased to an average of 877 mg/l when the brine contained 0.5 percent NaOH. There was also an average loss of 45 percent of the NaOH due to the dissolution process. The final three samples, 10, 11 and 12, show very plainly that a carbonate cannot be used as the alkali in the presence of anhydrite. The carbonate was completely precipitated.

It is evident from Examples 1 and 2 that: (1) small additional amounts of sulfate, based on solubility product calculations, had little effect on $CaSO_4$ dissolution; (2) calcium concentrations (and $CaSO_4$ dissolution) increased when hydroxide was used as the alkali; and (3) a high percentage of the hydroxide was consumed.

EXAMPLE 3

In this example samples were prepared using the soft Brine No. 2 + 0.5% NaOH with increments of sodium sulfate ranging from 5 down to 1 percent. After equilibration with anhydrite at 90° F., the calcium and hydroxide concentration were determined. The results are shown in Table 4.

TABLE 4

ANHYDRITE SOLUBILITY IN SOFTENED BRINE NO. 2 WITH HIGH SULFATE

| | Before Equilibration | | After Equilibration | | |
|---|---|---|---|---|---|
| Sample Number | Added Sulfate, mg/l | Alkali, mg/l as NaOH | Calcium, mg/l | Alkali, mg/l as NaOH | % Hydroxide Lost |
| 1 | 33800 (5%) | 5109 | 630 | 5125 | 0 |
| 2 | 27040 (4%) | 5109 | 630 | 5094 | 0 |
| 3 | 20280 (3%) | 5109 | 730 | 4894 | 4 |
| 4 | 13520 (2%) | 5109 | 720 | 4235 | 17 |
| 5 | 6760 (1%) | 5109 | 740 | 3612 | 29 |

The data show that at slightly above 3 percent $Na_2SO_4$ the hydroxide concentration stabilized at the initial concentration. At lower sulfate concentrations there was some loss of hydroxide, although the 4 percent loss with 3 percent $Na_2SO_4$ would certainly be acceptable. The calcium concentration stabilized at 630 mg/l which is very close to the concentration of 660 mg/l in Brine No. 1.

It is thus apparent from the data that large amounts of sulfate are effective in preventing $CaSO_4$ dissolution.

EXAMPLE 4

A Brine No. 3 was prepared by equilibrating Brine No. 2 with $CaSO_4$ after adding 4 percent $Na_2SO_4$. This brine was used in various cosurfactant solutions to determine if low IFT's (interfacial tensions) could be generated.

For comparative purposes, to determine the effect of the calcium ions on the IFT's, a series of measurements was made in softened Brine No. 3. Then the best cosurfactants from the soft brine were used in the normal Brine No. 3. The results are shown in Table 5 for the seven cosurfactants that were used. Only four of them were judged good enough to be tried in the hard brine tests.

TABLE 5
INTERFACIAL TENSIONS FOR COSURFACTANT-NaOH SOLUTIONS AND CRUDE OIL BRINE NO. 3

| | Cosurfactant | | Minimum IFT, dynes/cm | |
|---|---|---|---|---|
| Sample Number | Type | Concentration, % | Soft Brine No. 3 | Brine No. 3 |
| 1 | AP2E2S[1] | 0.3 | 0.135 | — |
| 2 | AP2E2S | 0.1 | 0.065 | — |
| 3 | AP5E2S[2] | 0.3 | 0.048 | 0.125 |
| 4 | AP5E2S | 0.1 | 0.018 | 0.109 |
| 5 | AP7E2S[3] | 0.5 | — | 0.024 |
| 6 | AP7E2S | 0.3 | 0.005 | 0.019 |
| 7 | AP7E2S | 0.1 | 0.004 | 0.023 |
| 8 | Dowfax 2A1[4] | 0.3 | 0.075 | 1.08 |
| 9 | Dowfax 2A1 | 0.1 | 0.044 | 0.83 |
| 10 | Stepanflo 10[5] | 0.3 | 0.014 | 0.65 |
| 11 | Stepanflo 10 | 0.1 | 0.003 | 0.236 |
| 12 | Stepanflo 12[6] | 0.3 | 0.361 | — |
| 13 | Stepanflo 12 | 0.1 | 0.275 | — |
| 14 | Stepanflo 20[7] | 0.3 | 0.297 | — |
| 15 | Stepanflo 20 | 0.1 | 0.144 | — |
| 16 | No cosurfactant | — | 0.384 | 4.15 |

[1]Shell $C_{12-15}$ (propylene oxide)$_x$(ethylene oxide)$_y$OSO$_3$Na where x = 2, 5, 7 and y = 2.
[2]Shell $C_{12-15}$ (propylene oxide)$_x$(ethylene oxide)$_y$OSO$_3$Na where x = 2, 5, 7 and y = 2.
[3]Shell $C_{12-15}$ (propylene oxide)$_x$(ethylene oxide)$_y$OSO$_3$Na where x = 2, 5, 7 and y = 2.
[4]Disulfonated diphenyl ether with one or two $C_{12}$ alkyl groups.
[5]Alphaolefin sulfonates of increasing molecular weight.
[6]Alphaolefin sulfonates of increasing molecular weight.
[7]Alphaolefin sulfonates of increasing molecular weight.

It is apparent from the data that Samples 5, 6 and 7 were most effective in reducing interfacial tension.

EXAMPLE 5

Tertiary oil recovery tests were made in cores that had been solvent cleaned and then potted in epoxy resin. The cores were 1-inch in diameter and about 3 inches long. The brine used to saturate the evacuated cores was Brine No. 1. The cores were flooded to irreducible water saturation with crude oil that had been collected at a production manifold in the field. The crude was filtered before use with a 0.8-micron Millipore ® filter and was considered to be uncontaminated with oil field chemicals because an IFT with deionized water was 34 dyne/cm. The viscosity was 17 centipoise (cp) at 90° F.

The cores were water flooded at 2 cc/hr with the same brine used to saturate them. The chemical slugs were injected into the watered-out cores at a rate of 1 cc/hr, which was equivalent to a frontal advance rate of about 1 ft/day. Each chemical slug contained the Shell cosurfactant AP7E2S used in Samples 5, 6 and 7 of Example 4. The cosurfactant concentration was either 0.5 or 0.3 percent by weight. The alkali used was 0.5 percent NaOH. The chemical slugs were prepared in Brine No. 3.

An attempt to provide some mobility control to the process was made by using Flocon 4800, a polysaccharide broth polymer.

The oil recovery results and slug compositions are set forth in Table 6.

TABLE 6
COSURFACTANT-ENHANCED ALKALINE TERTIARY OIL RECOVERY

| Slug Composition | Slug Size, PV | Core PV, ml | OOIP, % PV | $S_{or}$, % PV | $\Delta S$ Oil Produced, % PV | (ml) |
|---|---|---|---|---|---|---|
| 1 | 0.5 | 6.61 | 82.1 | 30.3 | 20.0 | (1.2) |
| 2 | 0.5 | 6.68 | 81.7 | 41.9 | 32.9 | (2.2) |
| 2 | 0.5 | 5.00 | 71.4 | 32.6 | 13.6 | (0.97) |
| 3 | 1.4 | 7.00 | 79.3 | 18.9 | 13.9 | (0.68) |

Slug Compositions
1. 0.5 percent AP7E2S in Brine No. 3+0.5 percent NaOH with 2000 ppm Flocon 4800 polymer, 18.1 cp.
2. 0.3 percent AP7E2S in Brine No. 3+0.5 percent NaOH with 2000 ppm Flocon 4800 polymer, 14.4 cp.
3. Same as 2 without polymer.
PV—Pore Volume
OOIP—Original oil in place
$S_{or}$—Residual oil saturation
$\Delta S$—Volume of tertiary oil recovered The data of Table 6 shows that cosurfactant-enhanced alkaline flood is effective in recovering tertiary oil in a system containing excess $CaSO_4$ if a substantial amount of sodium sulfate is added to the flooding material.

I claim:
1. In a process in which a subterranean oil-bearing formation containing calcium sulfate dispersed throughout the formation rock is subjected to a cosurfactant-enhanced alkaline flood in which a flooding composition comprising a surfactant and an alkaline material is injected into the formation, the improvement wherein a sulfate selected from the group consisting of alkali metal sulfates and ammonium sulfate is included in said flooding composition in an amount sufficient to stabilize the hydroxide concentration of said flooding composition and to prevent substantial loss of hydroxide therefrom during passage of said flooding composition through said formation.

2. The process of claim 1 wherein said alkaline material is sodium hydroxide.

3. The process of claim 2 wherein said sulfate is sodium sulfate in an amount greater than 3 percent by weight of said flooding composition.

* * * * *